(12) United States Patent
Isomura et al.

(10) Patent No.: US 6,437,027 B1
(45) Date of Patent: Aug. 20, 2002

(54) PROCESS FOR PRODUCING DISPERSANT FOR POWDERY HYDRAULIC COMPOSITION

(75) Inventors: Hirotaka Isomura; Hiroshi Hayashi; Kazuhisa Tsukada; Koichi Soeda, all of Sakura; Kenjiro Makino, Nebeoka; Masaki Takimoto, Sakura, all of (JP)

(73) Assignee: Taiheiyo Cement Corporation, Tokyo (JP)

( * ) Notice: Subject to any disclaimer, the term of this patent is extended or adjusted under 35 U.S.C. 154(b) by 0 days.

(21) Appl. No.: 09/600,858

(22) PCT Filed: Nov. 29, 1999

(86) PCT No.: PCT/JP99/06648

§ 371 (c)(1),
(2), (4) Date: Jul. 27, 2000

(87) PCT Pub. No.: WO00/32534

PCT Pub. Date: Jun. 8, 2000

(30) Foreign Application Priority Data

| Nov. 30, 1998 | (JP) | 10-339215 |
| Jun. 18, 1999 | (JP) | 11-172350 |
| Jul. 23, 1999 | (JP) | 11-209122 |
| Jul. 23, 1999 | (JP) | 11-209123 |
| Aug. 26, 1999 | (JP) | 11-239972 |
| Aug. 26, 1999 | (JP) | 11-239973 |
| Aug. 27, 1999 | (JP) | 11-241553 |

(51) Int. Cl.$^7$ ............................................. C08K 3/00
(52) U.S. Cl. ...................... 524/5; 526/318.42
(58) Field of Search ................................ 524/5

(56) References Cited

U.S. PATENT DOCUMENTS

| 4,089,831 A | * | 5/1978 | Chambers | 260/29.6 |
| 4,663,385 A | * | 5/1987 | Chang | 524/523 |
| 5,252,670 A | * | 10/1993 | Sagawa | 525/124 |
| 5,707,445 A | * | 1/1998 | Yamato | 106/802 |
| 6,048,916 A | * | 4/2000 | Hirata | 524/5 |
| 6,150,437 A | * | 11/2000 | Wutz | 524/26 |
| 6,166,112 A | * | 12/2000 | Hirata | 524/5 |
| 6,187,841 B1 | * | 2/2001 | Tanaka | 524/5 |

FOREIGN PATENT DOCUMENTS

| EP | 601518 | 6/1994 |
| JP | 07-014829 | 2/1995 |
| JP | 2669761 | 7/1997 |

* cited by examiner

Primary Examiner—Paul R. Michl
(74) Attorney, Agent, or Firm—Oblon, Spivak, McClelland, Maier & Neustadt, P.C.

(57) ABSTRACT

The present invention relates to a process for producing a powdery dispersant for preparing hydraulic compositions, which process includes adding an reducing agent to a solution predominantly containing a polycarboxylate polymer compound having a polyalkylene glycol chain, drying the resultant mixture, and pulverizing the dried product; the resultant powdery dispersant for preparing hydraulic compositions; and a hydraulic composition containing the dispersant. According to the present invention, there can be provided a powdery dispersant for preparing a hydraulic composition, which has excellent fluidity and dispersibility. The dispersant can be added to cement in advance.

27 Claims, No Drawings

PROCESS FOR PRODUCING DISPERSANT FOR POWDERY HYDRAULIC COMPOSITION

TECHNICAL FIELD

The present invention relates to a powdery dispersant suitable for producing hydraulic compositions, such as cement, of excellent fluidity; a process for producing the dispersant; and a hydraulic composition containing the dispersant. More particularly, the invention relates to a powdery dispersant which can be incorporated in advance into a pre-mixed hydraulic composition product; a process for producing the dispersant; and a variety of hydraulic compositions containing the dispersant.

BACKGROUND ART

Mechanical strength and durability of hardened cement-containing compositions such as concrete and mortar increase as the water/cement ratio (W/C) decreases, whereas fluidity and workability of the compositions become poor as the W/C ratio decreases. Therefore, a cement dispersant is added to hydraulic compositions in order to assure sufficient fluidity thereof, even though the compositions have a low W/C ratio. Liquid-type dispersants and powdery dispersants predominantly containing a naphthalenesulfonate salt-formalin condensate or a melaminesulfonate salt-formalin condensate are widely employed as the aforementioned dispersants for preparing hydraulic compositions. However, when these dispersants are added to a hydraulic composition, fluidity thereof greatly decreases with elapse of time, thereby disadvantageously lowering workability. Therefore, there have also been employed dispersants containing, as an active ingredient, a polycarboxylate polymer obtained from an acid such as acrylic acid or methacrylic acid.

Since dispersants containing a polycarboxylate polymer are generally in the form of liquid, they cannot be incorporated into a pre-mixed product, which is frequently employed as a plastering material. As compared with powdery dispersants, liquid dispersants require care for transportation and containers, as well as additional treatment of the containers, to thereby increase cost for use of liquid dispersants. In addition, since formalin which is contained in a sulfonate salt-formalin condensate is a hazardous substance, restriction is imposed on handling and use of dispersants containing a formalin condensate.

Thus, pulverization of a dispersant containing a polycarboxylate polymer as a predominant ingredient has been investigated. However, when a powdery dispersant having high solubility to water is produced through a conventional pulverization technique (Japanese Patent Publication (kokoku) No. 7-14829), an insoluble gel is formed during pulverization and the thus-obtained powder has poor characteristics, e.g., poor dispersibility.

Pulverization by means of a spray-drier is also a known technique (Japanese Patent No. 2669761). Since a large amount of inorganic powder must be used in combination in the above technique, the polycarboxylate polymer content in the formed dispersant decreases or the polymer is adsorbed with the inorganic powder, to thereby disadvantageously lower dispersion performance during use in an aqueous solution. Furthermore, when an attempt is made to produce such a dispersant at high content, i.e., approximately 100%, a portion of the product is adsorbed inside a drying tower, thereby lowering production yield thereof. When pulverization of a high-viscoelasticity polymer is attempted, overload of a motor prevents continuous and safe operation. In addition, water removed during a drying step tends to exhibit a high COD, to thereby require additional wastewater treatment.

In view of the foregoing, an object of the present invention is to provide a high-performance powdery dispersant for preparing a high-fluidity hydraulic composition, which dispersant contains a polycarboxylate polymer having a polyalkylene glycol chain. Another object of the invention is to provide a process for effectively producing the dispersant. Still another object is to provide a hydraulic composition containing the dispersant.

DISCLOSURE OF THE INVENTION

The present inventors have conducted earnest studies, and have found that when a reducing agent is added to polycarboxylate polymer having a polyalkylene glycol chain and the resultant mixture is dried and pulverized, there is effectively produced a powdery dispersant which imparts excellent fluidity to a hydraulic composition. The present invention has been accomplished on the basis of this finding.

Accordingly, the present invention provides a process for producing a powdery dispersant for preparing a hydraulic composition, which process comprises adding a reducing agent to a liquid predominantly containing a polycarboxylate polymer having a polyalkylene glycol chain, and drying and pulverizing the resultant mixture. The invention also provides the thus-produced powdery dispersant for preparing a hydraulic composition.

Further, the present invention provides a granular hydraulic composition containing hydraulic material and the aforementioned powdery dispersant for preparing a hydraulic composition.

Further, the present invention provides a cement grout composition containing a binder, an aggregate, an expansion accelerator, and the aforementioned powdery dispersant for preparing a hydraulic composition.

Still further, the present invention provides a self-leveling cement composition containing a binder, a fine aggregate, a defoaming agent, and the aforementioned powdery dispersant for preparing a hydraulic composition.

Still further, the present invention provides a quick-setting grout composition containing a quick-setting cement, gypsum, and the aforementioned powdery dispersant for preparing a hydraulic composition.

Still further, the present invention provides a quick-setting self-leveling composition containing a quick-setting cement, gypsum, a defoaming agent, and the aforementioned powdery dispersant for preparing a hydraulic composition.

Still further, the present invention provides a cement composition which contains the aforementioned powdery dispersant for preparing a hydraulic composition, and a cement predominantly containing calcium aluminates.

BEST MODE FOR CARRYING OUT THE INVENTION

No particular limitation is imposed on the polycarboxylate polymer compounds having a polyalkylene glycol chain which may be employed in the present invention, so long as the compounds may be employed as cement dispersants. Examples of such polymer compounds include (A) (meth) acrylate copolymers having a polyalkylene glycol chain and (B) maleate copolymers having a polyalkylene glycol chain (in the case of (B), multi-valent metal salts thereof are excluded). These may be employed singly or in combination of two or more species.

Of copolymers (A), preferable ones are (meth)acrylate copolymers having a polyalkylene glycol chain and a group —COOM (wherein M represents a hydrogen atom, an alkali metal, an alkaline earth metal, ammonium, or an organic amine). Of copolymers (B), preferable ones are polyalkylene glycol alkenyl ether-maleic anhydride copolymers (with multi-valent salts thereof being excluded).

In the aforementioned (meth)acrylate copolymers (A), M of the group —COOM is preferably a hydrogen atom; an alkali metal such as sodium or potassium; an alkaline earth metal such as calcium or magnesium; ammonium; or an organic amine.

In the aforementioned copolymers (A) and (B), a polyalkylene glycol chain is preferably a C2–C4 polyalkylene glycol chain, more preferably a chain represented by —O(CH$_2$CH(R$^3$)O)$_n$—. In the chain —O(CH$_2$CH(R$^3$)O)$_n$, R$^3$ represents a hydrogen atom or a methyl group, and n is 2–200, preferably 5–109, more preferably 20–109, still more preferably 30–109.

Of the aforementioned copolymers (A), preferable ones are acrylate or methacrylate polymer compounds comprising at least two different structural units represented by the following formulas (1) and (2):

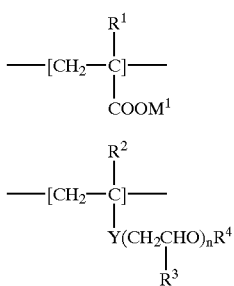

(wherein each of R$^1$, R$^2$, and R$^3$, which may be identical to or different from one another, represents a hydrogen atom or a methyl group; R$^4$ represents a C1–C3 alkyl group; M$^1$ represents a hydrogen atom, an alkali metal, an alkaline earth metal, ammonium, or an organic amine; Y represents —CH$_2$O— or —COO—; and n is 2–200).

There are two types of structural unit (2); a structural unit in which Y is —CH$_2$O— and a structural unit in which Y is —COO—, and either or both of these two units may be present in copolymers (A). In the case in which both are present, either of the structural units may have a mean molecular number (n) of 2–200, and preferably, the amount of structural unit (2) in which Y is —COO— is 1–30 mol % and the amount of structural unit (2) in which Y is —CH$_2$O— is 1–30 mol %.

In the present invention, (meth)acrylate polymer compounds may comprise, in addition to the aforementioned structural units represented by formulas (1) or (2), at least one of structural units represented by the following formulas (3) and (4):

(3)

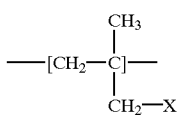

-continued (4)

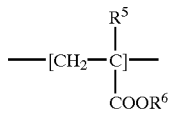

[wherein R$^5$ represents a hydrogen atom or a methyl group; R$^6$ represents C1–C3 alkyl group; and X represents SO$_3$M$^2$ or —O—Ph—SO$_3$M$^2$ (wherein M$^2$ represents a hydrogen atom, an alkali metal, an alkaline earth metal, ammonium, or an organic amine, and Ph represents a phenylene group)].

In addition, preferable (meth)acrylate copolymers (A) include (meth)acrylate copolymers having a number average molecular weight of 2,000–50,000, comprising structural unit (1) represented by formula (1) in an amount of 40–80 mol %, structural unit (2) represented by formula (2) in an amount of 1–45 mol %, structural unit (3) represented by formula (3) in an amount of 2–25 mol %, and structural unit (4) represented by formula (4) in an amount of 3–20 mol %.

In the aforementioned formulas (1) to (4), each of R$^1$ and R$^2$ preferably represents a methyl group. Each of R$^4$ and R$^6$ may be a methyl group, an ethyl group, an n-propyl group, or an i-propyl group. Of these, a methyl group is preferable. M$^1$ is preferably sodium, potassium, calcium, magnesium, or an alkanolamine. Of these, sodium is particularly preferable, in consideration of water-solubility. M$^2$ of a group X may be an alkali metal such as sodium or potassium, an alkaline earth metal such as calcium or magnesium, ammonium, or an organic amine including an alkanolamine such as ethanolamine. The group X is preferably —SO$_3$Na. In formula (2), n is 2–200, preferably 5–109, more preferably 20–109, still more preferably 30–109. Structural unit (1) is preferably present in an amount of 40–80 mol %, more preferably 45–75 mol %. Structural unit (2) is preferably present in an amount of 1–45 mol %, more preferably 3–40 mol %. Structural unit (3) is preferably present in an amount of 2–25 mol %, more preferably 5–20 mol %. Structural unit (4) is preferably present in an amount of 3–20 mol %, more preferably 5–15 mol %. As used herein, mol % of each structural unit is on the basis of the case in which total mol % of structural units (1) to (4) is 100 mol %.

More preferable (meth)acrylate copolymers (A) are (meth)acrylate copolymers having a number average molecular weight of 2,000–50,000, which comprise structural unit (5) represented by the following formula (5) in an amount of 40–70 mol %, structural unit (6) represented by the following formula (6) in an amount of 5–30 mol %, structural unit (7) represented by the following formula (7) in an amount of 1–20 mol %, structural unit (8) represented by the following formula (8) in an amount of 1–30 mol %, and structural unit (9) represented by the following formula (9) in an amount of 1–30 mol %:

(5)

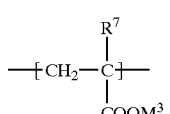

(6)

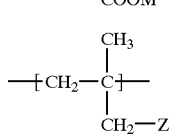

-continued

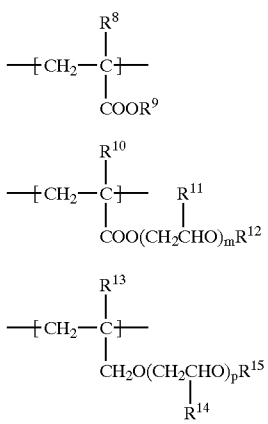

[wherein $R^7$, $R^8$, $R^{10}$, $R^{11}$, $R^{13}$, and $R^{14}$, which may be identical to or different from one another, each represent a hydrogen atom or a methyl group; $R^9$, $R^{12}$, and $R^{15}$ each represent a C1–C3 alkyl group; $M^3$ represents a hydrogen atom, an alkali metal, an alkaline earth metal, ammonium, or an organic amine; Z represents —$SO_3M^4$ or —O—Ph—$SO_3M^4$ (wherein $M^4$ represents a hydrogen atom, an alkali metal, an alkaline earth metal, ammonium, or an organic amine, and Ph represents a phenylene group); m is an integer of 2–200; and p is an integer of 2–109].

In the aforementioned formulas (5) to (9), $R^7$, $R^{10}$, and $R^{13}$ each preferably represents a methyl group. $R^9$, $R^{12}$, and $R^{15}$ may each represent a methyl group, an ethyl group, an n-propyl group, or an i-propyl group. Of these, a methyl group is preferable. $M^3$ and $M^4$ each preferably represent sodium, potassium, calcium, magnesium, or an alkanolamine. Of these, sodium is more preferable. Group Z is preferably —$SO_3Na$. In formula (8), m is 2–200, preferably 5–109, more preferably 20–109, still more preferably 30–109. In formula (9), p is 2–109, preferably 5–50. Structural unit (5) is preferably present in an amount of 40–70 mol %, more preferably 45–65 mol %. Structural unit (6) is preferably present in an amount of 5–30 mol %, more preferably 8–23 mol %. Structural unit (7) is preferably present in an amount of 1–20 mol %, more preferably 1–15 mol %. Structural unit (8) is preferably present in an amount of 1–30 mol %, more preferably 5–25 mol %. Structural unit (9) is preferably present in an amount of 1–30 mol %, more preferably 3–25 mol %. As used herein, mol % of each structural unit is on the basis of the case in which total mol % of structural units (5) to (9) is 100 mol %.

(Meth)acrylate copolymers comprising the aforementioned structural units preferably have a number average molecular weight of 2,000–50,000 (calculated by means of GPC, as reduced to polyethylene glycol), more preferably 3,500–30,000.

Meanwhile, maleate copolymers (B) may be methylpolyethylene glycol vinyl ether-maleic anhydride copolymers, polyethylene glycol allyl ether-maleic anhydride copolymers, methylpolyethylene glycol allyl ether-maleic anhydride copolymers, or methyl methacrylate polyethylene glycol-maleate copolymers. Copolymers (B) preferably have a number average molecular weight (calculated by means of GPC, as reduced to polyethylene glycol) of 3,000–200,000, more preferably 3,000–80,000.

The powdery dispersant for preparing a hydraulic composition of the present invention is produced by adding a reducing agent to a solution predominantly comprising the aforementioned polycarboxylate polymer compound having a polyalkylene glycol chain, and then drying and pulverizing the resultant mixture. The solution predominantly comprising the aforementioned polycarboxylate polymer compound may contain water, a solution of organic solvent, or a dispersing solution.

When a solution predominantly comprising the polycarboxylate polymer compound having a polyalkylene glycol chain is acidic, an aqueous solution of alkali metal or alkaline earth metal such as sodium hydroxide, potassium hydroxide, or calcium hydroxide is preferably added to the polymer solution, adjusting the pH of the solution to 7–9. Since the polymer compound is easily hydrolyzed, the pH of the solution is adjusted in order to prevent deformation or property deterioration of the polymer compound in the solution accompanying hydrolysis of the compound during heating and drying, which are performed later. When the pH of the solution is less than 7, large amounts of reducing agent are required, whereas when the pH is in excess of 9, the polymer compound is easily hydrolyzed or the COD of water that is removed when the solution is dried becomes high, which is unsatisfactory. When the pH of the solution is adjusted to 7–9 in advance, adjusting the pH by the addition of a pH-adjusting agent is unnecessary. Subsequently, a reducing agent is added to the solution having a pH of 7–9. A reducing agent which is added may be any of known ones, so long as it rarely reacts with the polymer compound which is a primary component of the solution. A reducing agent may be a reducing inorganic compound and/or a reducing organic compound.

When a reducing inorganic compound and/or a reducing organic compound are incorporated into a solution predominantly comprising the polycarboxylate polymer compound having a polyalkylene glycol chain, the load imposed on a kneader-mixer is reduced during drying and pulverizing, gel is not produced during drying, and the COD (chemical oxygen demand) of water that is removed is reduced.

Examples of reducing inorganic compounds include sulfite salts, nitrite salts, and thiosulfate salts. These salts are preferably alkali metal salts or alkaline earth metal salts. The reason why gelation is prevented during kneading and mixing in a drying step by the addition of such a reducing inorganic agent has not been elucidated, but it is considered that the reducing inorganic agent may inactivate a radical reaction initiator remaining in the solution comprising the polycarboxylate copolymer. Therefore, the amount of a reducing inorganic agent is determined in accordance with the species of radical reaction initiator remaining in the solution or the amount thereof. Usually, the amount of a reducing inorganic agent is equal to or less than the amount of a radical reaction initiator (as reduced to solid: mol), which is employed for synthesis of the polymer compound. Preferably, the amount of a reducing inorganic agent is equal to or less than the amount of a residual radical reaction initiator (as reduced to solid: mol), or is equal to or more than the amount of the reducing agent such that the reducing agent can inactivate the residual initiator for preventing oxidation by the initiator.

A reducing organic compound is preferably an amine compound, more preferably an alkanolamine. Specific examples include alkanolamines such as triethanolamine, diethanolamine, monoethanolamine, isopropanolamine, and N,N-diethylethanolamine; alkylamines such as sec-butylamine; and diamines such as ethylenediamine. When such a reducing organic compound is added to the solution comprising the polymer compound, the load imposed on a kneader-mixer is considerably reduced, and the COD of water that is removed during drying and pulverizing is reduced to 200 mg/L or less.

The amount of a reducing inorganic compound or a reducing organic compound which is added is preferably 0.01–2.5 wt. % on the basis of the solid content of the polycarboxylate polymer compound, more preferably 0.5–1.5 wt. %. When such a reducing organic compound is added to the solution comprising the polymer compound, the load imposed on a kneader-mixer is reduced during drying and pulverizing, and the COD of water that is removed during drying is reduced, for the reasons described below. The reducing agent may act as a powdering aiding agent, and the agent may facilitate polymerization by the effect of amine at a low temperature in the vicinity of room temperature, resulting in consumption of non-reacted monomer.

After a reducing agent is added to the solution comprising the polymer compound, the resultant mixture is kneaded and mixed. Kneading and mixing are preferably performed at a temperature of about 10–120° C., more preferably about 20–100° C.

The drying method which may be employed is not particularly limited, so long as a convection-type drying apparatus or a heat-conduction-type drying apparatus is employed. When the solution comprising the polymer compound in an amount of 5–40% is dried, a convection-type drying apparatus such as a spray drier or a flash jet drier is suitably employed. When the solution comprising the polymer compound in an amount of 40% or more or the solution of high viscoelasticity is dried, a heat-conduction-type drying apparatus such as a kneading-mixing drier or a band-type continuous vacuum drier is preferably employed. However, the polycarboxylate polymer compound having a polyalkylene glycol chain may have high viscosity when concentrated, and thus, in view of high efficiency of powdering, the polymer compound is preferably dried and pulverized while it is kneaded and mixed. Kneading and mixing are preferably carried out at a temperature of about 40–120° C., more preferably about 60–110° C. Kneading and mixing may be carried out in air, but are preferably carried out at reduced pressure or in an atmosphere of inert gas such as nitrogen or argon, in order to prevent deformation of the polymer compound. The polymer compound is preferably dried and pulverized while kneaded and mixed at a power of 0.5 kg/m$^3$/rpm or more, after the compound is concentrated so as to have a hardness of 30° or more. Through such a drying procedure, a powdery dispersant can be produced. After completion of drying, the powder may be agglomerated into a floc, but the floc is brittle and thus is easily formed into particles by low pulverizing power.

In the present invention, in order to improve the moisture absorbability or blocking ability of the powdery dispersant or to reduce error in weighing, in addition to the aforementioned essential components, polyalkylene glycols, C8–C22 fatty acids or salts thereof, or inorganic powder may further be incorporated into the powdery dispersant after drying.

Examples of preferable polyalkylene glycols include polyethylene glycol having a molecular weight of 1,000–20,000 and polypropylene glycol having a molecular weight of 2,000–6,000. Of these, polyethylene glycol is more preferable, and polyethylene glycol having a mean molecular weight of 2,000–4,000 is still more preferable.

C8–C22 fatty acids or salts thereof may be saturated or unsaturated, and may have a linear chain or branched chain. Specific examples include caprylic acid, pelargonic acid, capric acid, undecylic acid, lauric acid, tridecylic acid, myristic acid, pentadecylic acid, palmitic acid, heptadecylic acid, stearic acid, nonadecanoic acid, arachic acid, behenic acid, undecylenic acid, oleic acid, elaidic acid, cetoleic acid, erucic acid, brassidic acid, and salts thereof. Salts of the aforementioned fatty acids are preferably salts of metals such as sodium, potassium, barium, calcium, zinc, aluminum, and magnesium. Of these, stearic acid or salts thereof are preferable, and calcium stearate is more preferable. The amount of polyalkylene glycols or C8–C22 fatty acids or salts thereof is preferably 0.2–30 wt. % on the basis of the solid content of the polycarboxylate polymer compound having a polyalkylene glycol chain, more preferably 0.5–20 wt. %.

Examples of inorganic powders which may be employed include powder of inorganic salts such as calcium carbonate and calcium silicate; clay mineral powders such as kaolinite and bentonite; and fine powders such as blast furnace slag and fly ash. These inorganic powders are effectively employed in order to improve properties of the powdery dispersant, such as moisture absorbability and blocking ability thereof. In order to pulverize the polycarboxylate polymer compound at high concentration, the amount of inorganic powder which is employed is preferably 0.1–30 wt. % on the basis of the solid content of the compound, more preferably 0.5–10 wt. %.

In consideration of convenience upon use, the pulverized dispersant is preferably prepared so as to have a mean particle size of 5–2,000 μm, more preferably 10–500 μm, through arbitrary crushing and classification methods. However, the produced powdery dispersant is relatively weak against heat, and thus a crushing machine of low heat-storage is preferably employed for crushing the dispersant. Specifically, a pin-type mill is preferably employed. A crushing machine comprising a screen for regulating particle size may be employed, but preferably, crushing and classification are carried out separately, since heat of crushing increases when an uncrushed substance is accumulated in a crushing machine.

The powdery dispersant of the present invention is useful as a dispersant employed in a hydraulic composition such as cement, gypsum, fly ash, blast furnace slag, or silica fumes. Preferably, the powdery dispersant is employed as a cement dispersant.

No particular limitation is imposed on the hydraulic material, such as cement, to which the powdery dispersant may be applied. Examples of such cements include ordinary portland cement, high-early-strength cement, ultra high-early-strength cement, moderate-heat cement, sulfate-resistant cement, and blended cements such as blast furnace-slag cement, fly ash cement, and pozolan cement. In addition, the powdery dispersant may be applied to alumina cement containing large amounts of calcium aluminate, or eco-cement which is produced by firing at least one type of incinerated ashes of city refuse. Furthermore, the dispersant may be applied to spraying cement containing a setting accelerator, or a concrete composition containing blast furnace slag or fly ash as an aggregate component. Examples of hydraulic materials other than cement include gypsum, blast-furnace slag, fly ash, and silica fumes. The amount of the dispersant which is incorporated into a hydraulic material such as cement is appropriately 0.005–5 wt. % on the basis of cement (100 wt. %). Particularly, a granular cement mixture containing the dispersant in an amount of 0.01–3 wt. % is preferable. When the amount of the dispersant which is incorporated is less than 0.005 wt. %, the dispersion effect is reduced. Even when the amount is in excess of 5 wt. %, dispersibility is not further enhanced.

Hydraulic compositions comprising the dispersant of the present invention will next be described.

1. Cement Grout Composition

The cement grout composition of the present invention comprises a binder, an aggregate, an expansion accelerator, and the powdery dispersant for preparing a hydraulic composition of the present invention.

When the amount of the dispersant which is incorporated into the grout composition is very small, the effect of the dispersant is not obtained, whereas the amount is very large, the dispersant may cause retardation of setting of the composition or reduction in strength of the hardened composition. Therefore, the amount of the dispersant is preferably 0.005–5 parts by weight on the basis of 100 parts by weight of a binder, more preferably 0.01–3 parts by weight.

Examples of binders which may be employed in the present invention include cements other than quick-setting cements, such as portland cements (e.g., ordinary portland cement, high-early-strength cement, ultra high-early-strength cement, moderate-heat cement, and sulfate-resistant cement), and blended cements (e.g., blast furnace-slag cement, fly ash cement, and pozolan cement).

Examples of aggregates which may be employed in the present invention include river sand, sea sand, land sand, crushed sand, and silica sand. The sand is preferably dried when employed. The aforementioned sand may be employed in combination with fly ash, blast furnace slag, calcium carbonate, or silica fumes. When the grout composition is provided as a mixed grout mortar composition, an aggregate which is incorporated preferably has a size of 5 mm or less and an FM of approximately 1.5–3.0. In the case of a grout mortar composition, when the amount of an aggregate which is incorporated is very small, the hardened composition undergoes excessive shrinkage, whereas when the amount is very large, the fluidity of the composition or the strength of the hardened composition is reduced. Therefore, the amount of an aggregate is preferably 30–300 parts by weight on the basis of 100 parts by weight of a binder, more preferably 60–150 parts by weight.

In the present invention, an expansion accelerator is employed in order to secure adhesion of the grout composition to a structure. Therefore, there may be employed an expansion accelerator which exhibits the effect for reducing shrinkage of the hardened composition and an expansion effect by hydration. Examples of such expansion accelerators include calcium sulfur aluminate inorganic substances such as hauyne, calcium aluminate inorganic substances such as amorphous or crystalline aluminates, lime inorganic substances such as calcium oxide, and metal substances such as aluminum metal powder and iron powder. The amount of an expansion accelerator which is incorporated is as follows. In the case in which a lime expansion accelerator is incorporated, the amount is preferably 0.5–20 parts by weight on the basis of 100 parts by weight of a binder, more preferably 1–10 parts by weight. In the case in which aluminum metal powder is incorporated, the amount is preferably 0.0002–0.01 parts by weight on the basis of 100 parts by weight of a binder, more preferably 0.0006–0.008 parts by weight. In the grout composition, more preferably, aluminum metal powder is incorporated in combination with a calcium sulfur aluminate inorganic substance, a calcium aluminate inorganic substance, or a lime inorganic substance, since the effect for reducing shrinkage of the hardened composition is maintained for a prolonged period of time after the composition is produced.

The cement grout composition of the present invention may further contain a thickener.

In the present invention, a thickener is employed in order to prevent separation of materials, and therefore a thickener, which exhibits the effect for imparting viscosity, may be employed. For example, methyl cellulose or polyvinyl alcohol may be employed. The amount of a thickener which is incorporated is preferably 0.001–0.2 parts by weight on the basis of 100 parts by weight of a binder, more preferably 0.002–0.05 parts by weight.

If necessary, the cement grout composition of the present invention may contain, in addition to the aforementioned materials, an organic shrinkage-reducing agent. The composition may further contain extenders or admixtures, so long as they do not adversely affect the physical properties of the composition.

The cement grout composition of the present invention is usually provided in a bag-packed form, after the aforementioned materials are mixed. The composition is kneaded with water by use of a mixer at a building site, and then the resultant composition is installed. The type of a mixer which is employed is not particularly limited, and the amount of water which is added to the composition is usually 30–100 parts by weight on the basis of 100 parts by weight of a binder.

2. Self-leveling Cement Composition

The self-leveling cement composition of the present invention comprises a binder, a fine aggregate, a deforming agent, and the powdery dispersant for preparing a hydraulic composition of the present invention.

When the amount of the dispersant which is incorporated into the self-leveling cement composition is very small, the effect of the dispersant is not obtained, whereas the amount is very large, the dispersant may cause retardation of setting of the composition or reduction in strength of the hardened composition. Therefore, the amount of dispersant is preferably 0.005–5 parts by weight on the basis of 100 parts by weight of a binder, more preferably 0.01–3 parts by weight.

Examples of binders which are preferably employed in the present invention include cements other than quick-setting cements, such as portland cements (e.g., ordinary portland cement, high-early-strength cement, ultra high-early-strength cement, moderate-heat cement, and sulfate-resistant cement), and blended cements (e.g., blast furnace-slag cement, fly ash cement, and pozolan cement).

Examples of fine aggregates which may be employed in the present invention include river sand, sea sand, land sand, crushed sand, and silica sand. The sand is preferably dried when employed. The aforementioned sand may be employed in combination with fly ash, blast furnace slag, calcium carbonate, or silica fumes. A fine aggregate which is incorporated preferably has a size of 5 mm or less and an FM of approximately 1.5–3.0. In consideration of the fluidity of the composition or the strength of the hardened composition, the amount of an aggregate which is incorporated is preferably 30–300 parts by weight on the basis of 100 parts by weight of a binder, more preferably 60–150 parts by weight.

In the present invention, a deforming agent is employed in order to prevent rising or depression, which is attributed to foam, of a floor in which the composition is employed. A defoaming agent may be a known defoaming agent such as a silicone surfactant or nonionic surfactant. The amount of a defoaming agent which is incorporated is preferably 0.01–0.6 parts by weight on the basis of 100 parts by weight of a binder, more preferably 0.05–0.4 parts by weight.

The self-leveling cement composition of the present invention may further contain a thickener. In the present invention, a thickener is employed in order to prevent separation of materials or dry-shrinkage of the hardened composition. For example, methyl cellulose, hydroxyethyl cellulose, or carboxymethyl cellulose may be employed. In consideration of the fluidity and self-leveling ability of the composition, the amount of a thickener which is incorporated is preferably 0.005–0.6 parts by weight on the basis of 100 parts by weight of a binder, more preferably 0.01–0.4 parts by weight.

If necessary, the self-leveling cement composition of the present invention may contain, in addition to the aforementioned materials, an expanding agent or an organic shrinkage-reducing agent, in order to prevent cracking of the hardened composition attributed to shrinkage. The composition may further contain extenders or admixtures, so long as they do not adversely affect the physical properties of the composition.

The self-leveling cement composition of the present invention is usually provided in the form of mixture of the aforementioned materials. The composition is kneaded with water by use of a mixer at a building site, and then the resultant composition is installed. The type of a mixer which is employed is not particularly limited, and the amount of water which is added to the composition is usually 30–100 parts by weight on the basis of 100 parts by weight of a binder.

3. Quick-setting Grout Composition

The quick-setting grout composition of the present invention comprises quick-setting cement, gypsum, and the powdery dispersant for preparing a hydraulic composition of the present invention.

When the amount of the dispersant which is incorporated into the grout composition is very small, the effect of the dispersant is not obtained, whereas the amount is very large, the dispersant may cause retardation of setting of the composition or reduction in strength of the hardened composition. Therefore, the amount of dispersant is preferably 0.005–5 parts by weight on the basis of a binder (total of quick-setting cement, other cements, and gypsum) (100 parts by weight), more preferably 0.01–3 parts by weight.

In the present invention, any quick-setting cement may be employed, so long as the cement predominantly contains calcium aluminate. A preferable quick-setting cement contains monocalcium aluminate (CA) as a primary component, and contains $Al_2O_3$ in an amount of 65 wt. % or less. A more preferable quick-setting cement contains monocalcium aluminate (CA) as a primary component, and contains $Al_2O_3$ in an amount of 30–45 wt. %. In order to attain high fluidity and sufficient quick-setting ability of the composition, in the present invention, quick-setting cement is preferably employed in combination with portland cements (e.g., ordinary portland cement, high-early-strength cement, ultra high-early-strength cement, moderate-heat cement, and sulfate-resistant cement), or blended cements (e.g., blast furnace-slag cement, fly ash cement, and pozolan cement). When quick-setting cement and ordinary portland cement are employed in combination, the incorporation ratio of quick-setting cement to normal cement (by weight) is preferably 1/99 to 90/10, more preferably 3/97 to 50/50.

Gypsum which is employed in the present invention exhibits the effect for enhancing fluidity and quick-setting ability of the composition, and is also expected to exhibit an effect for reducing dry-shrinkage of the hardened composition. In the present invention, any anhydrous gypsum, hemihydrate gypsum, and dehydrate gypsum may be employed as gypsum, but anhydrous gypsum is most preferable, in consideration of fluidity and quick-setting ability of the composition and of reduction in dry-shrinkage of the hardened composition. The amount of gypsum which is incorporated is preferably 2–150 parts by weight on the basis of quick-setting cement (100 parts by weight), more preferably 10–70 parts by weight.

The quick-setting grout composition of the present invention may further contain a thickener, a setting modifier, an aggregate, and an expansion accelerator.

In the present invention, a thickener is employed in order to prevent separation of materials, and therefore a thicker which exhibits the effect for imparting viscosity may be employed. For example, methyl cellulose or polyvinyl alcohol may be employed. The amount of a thickener which is incorporated is preferably 0.001–0.2 parts by weight on the basis of 100 parts by weight of a binder, more preferably 0.002–0.05 parts by weight.

Examples of setting modifiers which are preferably employed include compounds which exhibit setting-acceleration effect; i.e., alkali metal salts, such as lithium carbonate, lithium hydroxide, lithium chloride, lithium nitrate, potassium carbonate, potassium hydroxide, sodium carbonate, and sodium hydroxide. Of these, lithium carbonate is more preferable. In consideration of fluidity of the composition and setting acceleration effect of such a compound, the amount of the compound which is incorporated is preferably 0.005–2 parts by weight on the basis of 100 parts by weight of a binder, more preferably 0.05–0.5 parts by weight. Also, examples of setting modifiers which are preferably employed include compounds which exhibit setting-retardation effect; i.e., hydroxycarboxylic acids (including salts therof), such as tartaric acid, citric acid, malic acid, gluconic acid, and salts thereof. Of these, tartaric acid and citric acid are more preferable. In consideration of quick-setting ability of the composition and setting-retardation effect of such a compound, the amount of the compound which is incorporated is preferably 0.005–3 parts by weight on the basis of 100 parts by weight of a binder, more preferably 0.03–1 parts by weight.

Examples of aggregates which may be employed in the present invention include river sand, sea sand, land sand, crushed sand, and silica sand. The sand is preferably dried when employed. The aforementioned sand may be employed in combination with fly ash, blast furnace slag, calcium carbonate, or silica fumes. When the grout composition is provided as a mixed grout mortar composition, an aggregate which is incorporated preferably has a size of 5 mm or less and an FM of approximately 1.5–3.0. In the case of a grout mortar composition, the amount of an aggregate which is incorporated is preferably 30–300 parts by weight on the basis of 100 parts by weight of a binder, more preferably 60–150 parts by weight.

In the present invention, an expansion accelerator is employed in order to secure adhesion of the grout composition to a structure. Therefore, there may be employed an expansion accelerator which exhibits an effect for reducing shrinkage of the hardened composition and an expansion effect by hydration. Examples of such expansion accelerators include calcium sulfur aluminate inorganic substances such as hauyne; calcium aluminate inorganic substances such as amorphous or crystalline aluminates; lime inorganic substances such as calcium oxide; and metal substances such as aluminum metal powder and iron powder. The amount of an expansion accelerator which is incorporated is as follows. In the case in which a lime expansion accelerator is incorporated, the amount is preferably 0.5–20 parts by weight on the basis of a binder (100 parts by weigh), more preferably 1–10 parts by weight. In the case in which aluminum metal powder is incorporated, the amount is preferably 0.0002–0.01 parts by weight on the basis of 100 parts by weight of a binder, more preferably 0.0006–0.008 parts by weight. In the grout composition, more preferably, aluminum metal powder is incorporated in combination with a calcium sulfur aluminate inorganic substance, a calcium aluminate inorganic substance, or a lime inorganic substance, since the effect for reducing shrinkage of the hardened composition is maintained for a prolonged period of time after the composition is produced.

If necessary, the quick-setting grout composition of the present invention may contain, in addition to the aforementioned materials, a shrinkage-reducing agent. The composition may further contain extenders or admixtures, so long as they do not adversely affect the physical properties of the composition.

The quick-setting grout composition of the present invention is usually provided in the form of mixture of the aforementioned materials. The composition is kneaded with water by use of a mixer at a building site, and then the resultant composition is installed. The type of a mixer which is employed is not particularly limited, and the amount of water which is added to the composition is usually 30–100 parts by weight on the basis of 100 parts by weight of a binder.

4. Quick-setting Self-leveling Composition

The quick-setting self-leveling composition of the present invention comprises quick-setting cement, gypsum, a defoaming agent, and the powdery dispersant for preparing a hydraulic composition of the present invention.

When the amount of the dispersant which is incorporated into the self-leveling composition is very small, the effect of the dispersant is not obtained, whereas the amount is very large, the dispersant may cause retardation of setting of the composition or reduction in strength of the hardened composition. Therefore, the amount of dispersant is preferably 0.005–5 parts by weight on the basis of a binder (total of quick-setting cement, other cements, and gypsum) (100 parts by weight), more preferably 0.01–3 parts by weight.

Quick-setting cement and gypsum employed in the self-leveling composition are the same as those employed in the above-described quick-setting grout composition.

In the present invention, a defoaming agent is employed in order to prevent generation of blisters or depressions, which are attributed to air bubbles, of the floor in which the composition is employed. A defoaming agent may be a known one such as a silicone surfactant or a nonionic surfactant. The amount of a defoaming agent which is incorporated is preferably 0.01–0.6 parts by weight on the basis of 100 parts by weight of a binder, more preferably 0.05–0.4 parts by weight.

The quick-setting self-leveling composition of the present invention may further contain a thickener, a setting modifier, and an aggregate.

In the present invention, a thickener is employed in order to prevent separation of materials or dry-shrinkage of the hardened composition. For example, methyl cellulose, hydroxyethyl cellulose, or carboxymethyl cellulose may be employed. In consideration of the fluidity and self-leveling ability of the composition, the amount of a thickener which is incorporated is preferably 0.005–0.6 parts by weight on the basis of 100 parts by weight of a binder, more preferably 0.01–0.4 parts by weight.

Examples of setting modifiers which are preferably employed include compounds which exhibits setting-acceleration effect, i.e., alkali metal salts, such as lithium carbonate, lithium hydroxide, lithium chloride, lithium nitrate, potassium carbonate, potassium hydroxide, sodium carbonate, and sodium hydroxide. Of these, lithium carbonate is more preferable. In consideration of fluidity of the composition and setting acceleration effect of such a compound, the amount of the compound which is incorporated is preferably 0.005–2 parts by weight on the basis of 100 parts by weight of a binder, more preferably 0.05–0.5 parts by weight. Also, examples of setting modifiers which are preferably employed include compounds which exhibit setting-retardation effect, i.e., hydroxycarboxylic acids (including salts thereof), such as tartaric acid, citric acid, malic acid, gluconic acid, and salts thereof. Of these, tartaric acid and citric acid are more preferable. In consideration of quick-setting ability of the composition and setting-retardation effect of such a compound, the amount of the compound which is incorporated is preferably 0.005–3 parts by weight on the basis of 100 parts by weight of a binder, more preferably 0.03–1 parts by weight.

Examples of fine aggregates which may be employed in the present invention include river sand, sea sand, land sand, crushed sand, and silica sand. The sand is preferably dried when employed. The aforementioned sand may be employed in combination with fly ash, blast furnace slag, calcium carbonate, or silica fume. A fine aggregate which is preferably incorporated has a size of 5 mm or less and an FM of approximately 1.5–3.0. In consideration of the fluidity of the composition or the strength of the hardened composition, the amount of a fine aggregate which is incorporated is preferably 30–300 parts by weight on the basis of 100 parts by weight of a binder, more preferably 60–150 parts by weight.

If necessary, the quick-setting self-leveling composition of the present invention may contain, in addition to the aforementioned materials, an expansive or a shrinkage-reducing agent, in order to prevent cracking of the hardened composition attributed to shrinkage. The composition may further contain extenders or admixtures, so long as they do not adversely affect the physical properties of the composition.

The quick-setting self-leveling composition of the present invention is usually provided in the form of mixture of the aforementioned materials. The composition is kneaded with water by use of a mixer at a building site, and then the resultant composition is installed. The type of a mixer which is employed is not particularly limited, and the amount of water which is added to the composition is usually 30–100 parts by weight on the basis of 100 parts by weight of a binder.

5. (Quick-setting) Cement Composition

The cement composition of the present invention comprises cement predominantly containing calcium aluminates, and the powdery dispersant for preparing hydraulic composition of the present invention.

When the amount of the dispersant which is incorporated into the cement composition is very small, the effect of the dispersant is not obtained, whereas when the amount is very large, the dispersant may cause retardation of setting of the composition or reduction in strength of the hardened composition. Therefore, the amount of dispersant is preferably 0.005–5 parts by weight on the basis of cement predominantly containing calcium aluminates (100 parts by weight), more preferably 0.01–3 parts by weight, still more preferably 0.05–1.5 parts by weight.

When the cement composition is employed as mortar or concrete, river sand, sea sand, land sand, crushed sand, or silica sand may be employed as an aggregate. The sand is preferably dried when employed. The aforementioned sand may be employed in combination with fly ash, blast furnace slag, calcium carbonate, or silica fume. When the cement composition is provided in the form of a premixed mortar composition, an aggregate which is incorporated preferably has a size of 5 mm or less and an FM of approximately 1.5–3.0. In the case of a mortar composition, the amount of an aggregate which is incorporated is preferably 30–300 parts by weight on the basis of a binder (cement predominantly containing calcium aluminates) (100 parts by weight), more preferably 60–150 parts by weight.

The cement composition of the present invention may contain a setting retarder or a setting accelerator, in order to regulating quick-setting ability of the composition. A setting retarder may be any compound which exhibits the effect for retarding hydration of cement predominantly containing calcium aluminates. For example, a compound having a hydroxycarboxyl group, such as citric acid, tartaric acid, or gluconic acid, may be employed. Examples of setting-accelerators include alkali metal salts such as potassium carbonate, sodium carbonate, sodium hydrogencarbonate, lithium carbonate, and sodium aluminate.

If necessary, the cement composition of the present invention may contain, in addition to the aforementioned materials, an expansive, a shrinkage-reducing agent, a thickener, or a setting ability-improving agent (e.g., gypsum). The composition may further contain extenders or admixtures, so long as they do not adversely affect the physical properties of the composition.

The cement composition of the present invention is usually provided in the form of mixture of the aforementioned materials. The composition is kneaded with water by use of a mixer at a building site, and then the resultant composition is installed. The type of a mixer which is employed is not particularly limited, and the amount of water which is added to the composition is usually 30–100 parts by weight on the basis of a binder (cement predominantly containing calcium aluminates) (100 parts by weight).

EXAMPLES

The present invention will next be described in more detail by way of examples, which should not be construed as limiting the invention thereto.

Examples 1 to 9

(Meth)acrylate polymers (A) to (D) were produced by use of $(NH_4)_2S_2O_8$ as a polymerization initiator. Each polymer comprises compounds corresponding to structural units (1) to (4) with compositional proportions (mol %) thereof as shown in Table 1. Liquid mixtures of a solid content of 45% were prepared from each polymer, and some prepared samples (Examples 1 and 5) had a pH of 6.7 and other prepared samples (Examples 2 to 4, 6 to 9, and Comparative Examples 1 to 3) had a pH of 6.1. To each sample (800 g) (only Examples 1 to 9 and Comparative Example 3), a 10 wt. % aqueous sodium hydroxide solution (75.2 g) was added for adjustment of the pH of the sample. Each of the thus-prepared samples was mixed by means of a handy-mixer for approximately three minutes at ambient temperature. After completion of mixing, a reducing agent was added to the sample, and the resultant mixture was placed in a 1-L kneader-mixer and kneaded at 90° C. and 30 Torr so as to concentrate and dry the mixture, thereby producing a powdery dispersant.

TABLE 1

| | Substances of structural unit and composition (mol %) | | | | |
|---|---|---|---|---|---|
| Polymers | formula (1) | formula (2) | formula (3) | formula (4) | No. av. mol. wt. |
| (A) | Na methacrylate (54) | Methoxy-PEG(n = 40) methacrylate (31) | Na methallyl sulfonate (7) | Methyl acrylate (8) | 11800 |
| (B) | Na methacrylate (63) | Methoxy-PEG(n = 75) methacrylate (9) | Na methallyl sulfonate (13) | Methyl acrylate (15) | 18900 |
| (C) | Na methacrylate (60) | Methoxy-PEG(n = 23) methacrylate (10) + Methoxy-PEG(n = 8) monoallyl ether (15) | Na methallyl sulfonate (8) + p-methallyloxy-benzene sulfonic acid (5) | Methyl acrylate (2) | 5600 |
| (D) | Na methacrylate (64) | Methoxy-PEG(n = 75) methacrylate (6) + Methoxy-PEG(n = 30) monoallyl ether (10) | Na methallyl sulfonate (10) + p-methallyloxy-benzene sulfonic acid (7) | Methyl acrylate (3) | 17000 |

Table 2 shows employed predominant polymeric ingredients (represented by (A) to (D) in Table 1); pH of liquid mixtures (adjusted pH for pH-adjusted samples); and reducing agents and the amounts of the agent (wt. % based on the solid weight of a mixture). The features of samples dried in the aforementioned manner are also shown in Table 2.

Subsequently, the average particle size of the thus-obtained dried powder was adjusted to 250 μm, and the powder (0.14 g) was added to ordinary portland cement (100 g) (product of Taiheiyo Cement), followed by mixing under dry conditions, to thereby prepare a cement mixture. Water (30 g) was added to the cement mixture, and the resultant mixture was kneaded by means of a Hobart mixer for three minutes. The paste flow of the kneaded product was measured. The above dried powder was also kneaded with water, and solubility to a cement slurry and the paste flow (mm) of the kneaded product are also shown in Table 2. In Comparative Example 4, there was employed a commercially available liquid cement dispersant containing a naphthalenesulfonate salt-formalin condensate as a predominant ingredient. In Comparative Example 5, there was employed a commercially available liquid cement dispersant containing a polycarboxylate polymer as a predominant ingredient. In Comparative Example 6, there was employed a commercially available powdery cement dispersant containing a polycarboxylate polymer as a predominant ingredient. Each of three dispersants (0.88 g, as solid content) was kneaded with cement (100 g) and water (30 g), to thereby prepare a paste, which was subjected to paste flow measurement. Paste flow was measured in the following manner. A hollow cylindrical pipe piece (inner diameter of 50 mm, height of 51 mm, inner volume of 100 mL) made of hard resin was placed upright on a horizontal polished glass plate. A kneaded cement paste was charged into the pipe piece to its top, and the pipe piece was lifted up immediately after charging. After slump of the paste stopped, two arbitrarily selected diameters of the bottom of the slumped paste, which were ordinary to each other, were measured, to thereby represent the average paste flow of the sample.

Examples 10 to 14
Preparation of Dispersants and Performance Test

Liquid mixtures of a solid content of 45% were prepared from each of polymers shown in Tables 3 and 4, to thereby prepare samples. To each sample (800 g) subjected to pH adjustment, a 10 wt. % aqueous sodium hydroxide solution (75.2 g) was added. Each of the thus-prepared sample was

TABLE 2

|  | Base component | pH of mixture | Reducing agents | Amount of reducing agent | Form after drying | Solubility to cement slurry | Paste flow |
|---|---|---|---|---|---|---|---|
| Ex. 1 | A | 8.3 | formaldehyde | 5 | powdery | dispersed | 187 |
| Ex. 2 | A | 7.4 | Na sulfite | 0.5 | powdery | dispersed | 151 |
| Ex. 3 | A | 7.4 | Na sulfite | 1 | powdery | dispersed | 191 |
| Ex. 4 | A | 7.4 | Na sulfite | 2 | powdery | dispersed | 187 |
| Ex. 5 | A | 8.3 | Na sulfite | 5 | powdery | dispersed | 183 |
| Ex. 6 | A | 7.4 | Na thiosulfate | 0.5 | powdery | dispersed | 150 |
| Ex. 7 | B | 7.4 | Na sulfite | 2 | powdery | dispersed | 220 |
| Ex. 8 | C | 7.4 | Na sulfite | 2 | powdery | dispersed | 191 |
| Ex. 9 | D | 7.4 | Na sulfite | 2 | powdery | dispersed | 222 |
| Comp. Ex. 1 | A | 6.1 | none | — | partially geled | insoluble matter | — |
| Comp. Ex. 2 | A | 6.1 | formaldehyde | 5 | partially geled | insoluble matter | — |
| Comp. Ex. 3 | A | 7.4 | none | — | partially geled | insoluble matter | — |
| Comp. Ex. 4 | commerical product | — | — | — | (liquid) | dispersed | 110 |
| Comp. Ex. 5 | commercial product | — | — | — | (liquid) | dispersed | 189 |
| Comp. Ex. 6 | commercial product | — | — | — | (powdery) | dispersed | 80 |

Polycarboxylate polymers employed in Examples described below are shown in Tables 3 and 4.

TABLE 3

Polycarboxylate polymer aqueous solution (1)
(45% solid content aqueous solution)

| formula (1) Na meth-acrylate | formula (2) Methoxy-PEG(n = 40) meth-acrylate | formula (3) Na methallyl-sulfonate | formula (4) Methyl acrylate | No. av. mol. wt. |
|---|---|---|---|---|
| 54 | 31 | 7 | 8 | 11800 |

TABLE 4

Polycarboxylate polymer aqueous solution (2)
(45% solid content aqueous solution)

| formula (1) Na meth-acrylate | formula (2) Methoxy-PEG(n = 40) meth-acrylate (16) + Methoxy-PEG(n = 23) meth-acrylate (15) | formula (3) Na methallyl-sulfonate | formula (4) Methyl acrylate | No. av. mol. wt. |
|---|---|---|---|---|
| 54 | 31 | 7 | 8 | 10900 | mixed by means of a handy-mixer for approximately three minutes at ambient temperature. After completion of mixing, at least one selected from sodium sulfite and triethanolamine was added, in an amount of 0.5–2 wt. % based on the solid content of the dispersant, to the sample to be subjected to reduction treatment, followed by stirring for three minutes. The resultant mixture was placed in a 1-L kneader-mixer and kneaded at 90° C. and 30 Torr so as to concentrate and dry the mixture. Table 5 shows employed reducing agents; pH adjustment; the amount of gel generated after drying and pulverization; load imposed on a kneader-mixer; and COD (chemical oxygen demand) of water removed during drying.

[Method for Measuring Water Content]

Water content was measured by means of a Kett water-content-measuring apparatus (type FD-600, product of KETT ELECTRIC LABORATORY).

[Method for Measuring COD]

COD of water was measured on the basis of JIS K0102. Specifically, a sample was acidified with sulfuric acid, and potassium permanganate serving as an oxidizing agent was added to the acidified sample. The mixture was allowed to react for 30 minutes in a boiling water bath. The amount of oxygen was calculated from the amount of consumed potassium permanganate.

$$COD = (b-a) \times f \times 0.2 \times 1000/V \text{ (mg/L)}$$

b: amount (mL) of N/40 potassium permanganate standard solution consumed in titration
a: amount (mL) of N/40 potassium permanganate standard solution consumed in blank test
V: volume of water sample (mL)
f: N/40, factor of $KMnO_4$ standard solution The load imposed on a kneader-mixer was measured by means of a torque meter (product of Yamazaki Seiki Kenkyusho). The amount of generated gel was measured by dissolving a powdery dispersant (20 g) in distilled water (200 mL), collecting formed insoluble gel, drying, and weighing.

TABLE 5

| Category | Polymer | pH adjustment | Pretreatment before pulverizing | | Load imposed on kneader-mixer (kg-cm) | Amount of generated Gel (g/20 g) | COD of removed water after drying (mg/L) |
|---|---|---|---|---|---|---|---|
| | | | Amount of reducing agent | | | | |
| | | | Na sulfite (%) | Triethanol-amine (%) | | | |
| Comp. Ex. 7 | Table 3 | 6.1 (unadjusted) | none | none | 20.0 | 9.2 | 1452 |
| Comp. Ex. 8 | Table 3 | 7.9 (adjusted) | none | none | 20.0 | 8.3 | 1310 |
| Comp. Ex. 9 | Table 3 | 6.1 (unadjusted) | 1 | none | 17.5 | 1.1 | 1301 |
| Comp. Ex. 10 | Table 4 | 6.1 (unadjusted) | 1 | none | 17.0 | 1.3 | 1350 |
| Comp. Ex. 11 | Table 3 | 6.1 (unadjusted) | 1.5 | none | 17.0 | 0 | 1078 |
| Comp. Ex. 12 | Table 3 | 7.7 (adjusted) | 1 | none | 16.0 | 0 | 863 |
| Comp. Ex. 13 | Table 4 | 7.7 (adjusted) | 1 | none | 16.5 | 0 | 795 |
| Comp. Ex. 14 | Table 3 | 7.7 (adjusted) | none | 0.5 | 6.0 | 4.0 | 309 |
| Comp. Ex. 15 | Table 3 | 7.7 (adjusted) | none | 1 | 4.0 | 3.2 | 273 |
| Comp. Ex. 16 | Table 3 | 7.7 (adjusted) | none | 2 | 3.5 | 1.9 | 253 |
| Example 10 | Table 3 | 8.0 (adjusted) | 0.5 | 0.5 | 3.5 | 0 | 146 |
| Example 11 | Table 3 | 7.8 (adjusted) | 1 | 0.5 | 3.5 | 0 | 130 |
| Example 12 | Table 4 | 7.9 (adjusted) | 0.5 | 0.5 | 3.5 | 0 | 135 |
| Example 13 | Table 3 | 7.9 (adjusted) | 0.5 | 1 | 2.0 | 0 | 125 |
| Example 14 | Table 3 | 7.9 (adjusted) | 0.5 | 2 | 1.0 | 0 | 109 |

*Environmental standard level of COD as provided by the Water Pollution Control Law is 200 mg/L.

As is clear from Table 5, when drying and pulverizing are carried out in the presence of a reducing inorganic compound and a reducing organic compound, pulverization can be carried out favorably while imposing a small load on a kneader. In addition, since removed water exhibits a low level of COD, wastewater treatment can be omitted. Furthermore, in the present invention no gel generation occurs during pulverizing.

Test Example 1

Each dried powder obtained in the aforementioned manner was crushed by means of a pin-type mill and passed through a sieve of 0.6 mm, to thereby prepare a powdery cement dispersant having a particle size of 0.6 mm or less. The powdery cement dispersant (0.10 g) was added to ordinary portland cement (100 g) (product of Taiheiyo Cement), followed by mixing under dry conditions, to thereby prepare a cement mixture. Water (30 g) was added to the cement mixture, and the resultant mixture was kneaded by means of a Hobart mixer for three minutes. The paste flow of the kneaded product was measured. The aqueous polymer solution shown in Table 3 was employed in the Comparative Test Example. The solution was added in an amount of 0.10 g as reduced to solid. Paste flow was measured in the following manner. A hollow cylindrical pipe piece (inner diameter of 50 mm, height of 51 mm, inner volume of 100 mL) made of vinyl chloride resin was placed upright on a horizontal glass plate (thickness 5 mm). A kneaded cement paste was charged into the pipe piece to its top, and the pipe piece was lifted up after charging. After slump of the paste stopped, two arbitrarily selected diameters of the bottom of the slumped paste, which were normal to each other, were measured, to thereby represent the average paste flow the sample. The results are shown in Table 6.

TABLE 6

| | Treatment with | Paste flow (mm) | Setting time | |
|---|---|---|---|---|
| | | | Initial (min) | Final (min) |
| Comp. Ex. | Aq. soln. (Table 3) | 187 | 250 | 370 |
| Ex. | Example 12 | 186 | 210 | 320 |

Examples 15 and 16

Cement Grout Composition

The following materials were employed in Examples 15 and 16.

[Materials Employed]

(1) Binder

High-early-strength portland cement (product of Taiheiyo Cement)

(2) Fine Aggregate

Lime stone crushed sand FM=2.5

(3) Powdery Cement Dispersant

1. Powdery cement dispersant according to the invention

[Process for producing the powdery cement dispersant employed in the invention]

Liquid mixtures of a solid content of 45% were prepared from each of polymers shown in Tables 3 and 4, to thereby prepare samples. To each sample (800 g), a 10 wt. % aqueous sodium hydroxide solution (75.2 g) was added for adjustment of pH. Each of the thus-prepared samples was mixed for approximately three minutes at ambient temperature. After completion of mixing, sodium sulfite and triethanolamine serving as reducing agents were added in amounts of 0.5–2 wt. % based on the solid content of the dispersant to the sample, followed by stirring for three minutes. The resultant mixture was placed in a 1-L kneader-mixer and kneaded at 90° C. and 30 Torr so as to concentrate and dry the mixture. The thus-obtained powder was crushed by means of a crusher (type MCG 180, product of Matsubara), to thereby prepare powdery cement dispersants (1) and (2) having a particle size of 50–500 μm as shown in Table 7.

TABLE 7

| Powdery cement dispersants | Solid content of polycarboxylate polymer (%) | Water content (%) |
|---|---|---|
| Powdery cement dispersant (1) | 98.2 | 1.8 |
| Powdery cement dispersant (2) | 97.9 | 2.1 |

2. Conventional powdery cement dispersant

Melment F10 (melaminesulfonate salt-formalin condensate, product of SKW Eastasia K.K.)

(4) Thickener

Metolose (cellulose thickener, product of Shin-Etsu Chemical Co., Ltd.)

(5) Expansion Accelerator

1. Calcium oxide expansive (Expan, product of Taiheiyo Cement)

2. Metallic aluminum powder (purity ≧99%, finess of powder ≧180 mesh, JIS K 5906 (Al powder for coating) type II, 88 μm residue ≦2%)

Examples of cement grout compositions according to the present invention will be shown in Table 8.

minutes after kneading with intervals of 15 minutes, so as to evaluate fluidity and viscosity, respectively. Bleeding ratio was measured so as to evaluate the degree of material separation. In addition, expansion coefficient after kneading to a material age of 24 hours and compressive strength to a material age of 28 days were measured. The results are shown in Tables 9 to 12.

[Method for Measuring Flow]

Flow was measured on the basis of the "Physical testing method for cement," JIS R 5201.

[Method for Measuring J-funnel Passing Time]

J-funnel passing time was measured on the basis of the PC testing method of grout (JSCE-F531) specified by of Japan Society of Civil Engineers. The employed J-funnel had a outlet having an inner diameter of 14 mm.

[Method for Measuring Expansion Coefficient]

Expansion coefficient was measured on the basis of the PC testing method of grout (container method) (JSCE-F533) specified by of Japan Society of Civil Engineers to a material age of 24 hours.

[Method for Measuring Bleeding Ratio]

Bleeding ratio was measured on the basis of the PC testing method of grout (polyethylene bag method) (JSCE-F532) specified by of Japan Society of Civil Engineers.

[Method Measuring Compressive Strength]

Compressive strength at the material age of 28 days was the basis of the "Physical testing method for cement," JIS R 5201.

TABLE 8 parts by weight

| | | Base | | Admixtures | | | Expansion accelerator | |
|---|---|---|---|---|---|---|---|---|
| | Composition | | Fine | Powdery dispersant | | | metallic Al | CaO |
| Category | No. | Binder | aggregate | Type | Amount | Thickener | powder | expansive |
| Ex. | 15 | 100 | 100 | Powdery cement dispersant (1) | 0.18 | 0.005 | 0.0015 | 5 |
| | 16 | 100 | 100 | Powdery cement dispersant (2) | 0.15 | 0.005 | 0.0015 | 5 |
| Comp. Ex. | 17 | 100 | 100 | Melment F10 | 1.0 | 0.005 | 0.0015 | 5 |

Performance tests of cement grout compositions according to the present invention were carried out as follows.

[Test Example]

Water (18 parts by weight) was added to each material (100 parts by weight) having a composition as shown in Table 8, and the resultant mixture was mixed for three minutes by means of a Hobart mixer, to thereby prepare a slurry. Flow and consistency (J-funnel passing time) of each slurry were measured from immediately after kneading to 75

TABLE 9

| Category | Composition No. | Time-elapsed change in flow (mm) after kneading | | | | | | Fluidity evaluation[1] |
|---|---|---|---|---|---|---|---|---|
| | | Immediately | 15 min | 30 min | 45 min | 60 min | 75 min | |
| Ex. | 15 | 231 | 233 | 235 | 235 | 232 | 230 | ○ |
| | 16 | 235 | 233 | 230 | 228 | 225 | 221 | ○ |
| Comp. Ex. | 17 | 231 | 208 | 200 | 191 | 177 | 164 | X |

[1]Evaluation of fluidity, ○: maintenance of a flow of 200 mm or more for 60 minutes or longer after kneading and X: a flow lowered to less than 200 mm

TABLE 10

| Category | Composition No. | Time-elapsed change in J-funnel passing time (sec) after kneading | | | | | | Viscosity evaluation[2] |
|---|---|---|---|---|---|---|---|---|
| | | Immediately | 15 min | 30 min | 45 min | 60 min | 75 min | |
| Ex. | 15 | 7.8 | 8.2 | 8.8 | 10.1 | 12.2 | 13.4 | ○ |
| | 16 | 7.3 | 7.8 | 8.5 | 10.4 | 12.4 | 13.7 | ○ |
| Comp. Ex. | 17 | 7.6 | 9.5 | 12.2 | 15.7 | 18.2 | 20.4 | X |

[2]Evaluation of viscosity, ○: a J-funnel passing time of 6–10 seconds immediately after kneading and maintenance of the time of 6–15 seconds for 60 minutes or longer after kneading and X: a J-funnel passing time falling out of the ranges

TABLE 11

| Category | Composition No. | Expansion coefficient (%) | | | | | Expansion coefficient evaluation[3] |
|---|---|---|---|---|---|---|---|
| | | 2 hrs | 4 hrs | 6 hrs | 12 hrs | 24 hrs | |
| Ex. | 15 | +0.16 | +0.40 | +0.72 | +0.91 | +0.95 | ○ |
| Comp. | 16 | +0.15 | +0.39 | +0.70 | +0.86 | +0.92 | ○ |
| Ex. | 17 | +0.13 | +0.33 | +0.67 | +0.83 | +1.01 | ○ |

[3]Evaluation of expansion coefficient, ○: 0–2% and X: out of the range

TABLE 12

| Category | Composition No. | Bleeding ratio | | Compressive strength | |
|---|---|---|---|---|---|
| | | (%) | Evaluation[4] | (N/mm²) | Evaluation[5] |
| Example | 15 | 0 | ○ | 51 | ○ |
| | 16 | 0 | ○ | 53 | ○ |
| Comp. Ex. | 17 | 0 | ○ | 47 | ○ |

[4]Evaluation of bleeding ratio, ○: <0.5% and X: ≧0.5%
[5]Evaluation of compressive strength, ○: ≧40 N/mm² and X: <40 N/mm²

As is clear from Tables 9 to 12, cement grout compositions according to the present invention maintain excellent filling ability and resistance to material separation for a long period of time and have an excellent bleeding ratio, an excellent expansion coefficient, and an excellent compressive strength, as compared with samples employing a conventional powdery cement dispersant.

Examples 17 and 18

Cement Self-leveling Compositions

The following materials were employed in Examples 17 and 18.

[Materials Employed]
(1) Binder
Ordinary portland cement (product of Taiheiyo Cement)
(2) Fine Aggregate
Silica sand (produced in Yamagata area) F. M=2.3

(3) Powdery Cement Dispersant

1. Powdery cement dispersant according to the present invention

Dispersants shown Table 7 were employed.

2. Conventional powdery cement dispersant

Melment F10 (melaminesulfonate salt-formalin condensate, product of SKW Eastasia)

(4) Thickener

Metolose (cellulose thickener, product of Shin-Etsu Chemical Co., Ltd.)

(5) Defoaming Agent

SN-defoamer 14HP (product of San Nopco Ltd.)

Examples of cement self-leveling compositions according to the present invention will be shown in Table 13.

TABLE 13 parts by weight

| Category | Composition No. | Base | | Admixtures | | | Defoaming agent |
|---|---|---|---|---|---|---|---|
| | | Binder | Fine aggregate | Powdery dispersant Type | Amount | Thickener | |
| Ex. | 17 | 100 | 100 | Powdery cement dispersant (1) | 0.20 | 0.2 | 0.2 |
| | 18 | 100 | 100 | Powdery cement dispersant (2) | 0.15 | 0.2 | 0.2 |
| Comp. Ex. | 18 | 100 | 100 | Melment F10 | 1.2 | 0.2 | 0.2 |

Performance tests of cement self-leveling compositions according to the present invention were carried out as follows.

[Test Example]

Water (21 parts by weight) was added to each material (100 parts by weight) having a composition as shown in Table 13, and the resultant mixture was mixed for three minutes by means of a Hobart mixer, to thereby prepare a slurry. Flow and consistency (J-funnel passing time) of each slurry were measured from immediately after kneading to five hours after kneading with intervals of one hour, so as to evaluate fluidity and viscosity, respectively. Setting time was measured so as to evaluate hardening rate. The results are shown in Tables 14 to 16.

[Method for Measuring Flow]

Paste flow was measured on the basis of JASS 15M-103 (quality standard of self-leveling material) specified by Architectural Institute of Japan in the following manner.

A hollow cylindrical pipe piece (inner diameter of 50 mm, height of 51 mm, inner volume of 100 mL) made of vinyl chloride resin was placed upright on a polished glass plate (thickness 5 mm). A prepared cement self-leveling composition was charged into the pipe piece to its top, and the pipe piece was lifted up after charging. After slump of the composition stopped, two arbitrarily selected diameters of the bottom of the slumped paste, which were normal to each other, were measured, to thereby represent the average paste flow the sample.

[Method for Measuring J-funnel Passing Time]

J-funnel passing time was measured on the basis of the method of consistency test (draft) described in "Industrial Material Standard Handbook (edited by Nihon Zairyo Gakkai)" published by Japan Society of Civil Engineers. The employed J-funnel had an outlet having an inner diameter of 10 mm.

[Method for Measuring Setting Time]

Setting time was measured on the basis of the "Physical testing method for cement," JIS R-5201.

TABLE 14

| Category | Composition No. | Time-elapsed change in flow (mm) after kneading | | | | | | | Fluidity evaluation[1] |
|---|---|---|---|---|---|---|---|---|---|
| | | Immediately | 1 hr | 2 hrs | 3 hrs | 4 hrs | 5 hrs | 6 hrs | |
| Example | 17 | 236 | 237 | 234 | 230 | 228 | 224 | 220 | ○ |
| | 18 | 243 | 244 | 242 | 235 | 228 | 214 | 205 | ○ |
| Comp. Ex. | 18 | 235 | 214 | 200 | 195 | 177 | 155 | 128 | X |

[1]Evaluation of fluidity, ○: maintenance of a flow of 200 mm or more for five hours or longer after kneading and X: a flow lowered to less than 200 mm

TABLE 15

| Category | Composition No. | Time-elapsed change in J-funnel passing time (sec) after kneading | | | | | | | Separation resistance evaluation |
|---|---|---|---|---|---|---|---|---|---|
| | | Immediately | 1 hr | 2 hrs | 3 hrs | 4 hrs | 5 hrs | 6 hrs | |
| Ex. | 17 | 20.2 | 22.4 | 23.2 | 23.7 | 24.7 | 25.7 | 27.3 | ○ |
| | 18 | 20.0 | 22.3 | 23.4 | 24.6 | 26.1 | 27.6 | 29.1 | ○ |

TABLE 15-continued

| Category | Composition No. | Time-elapsed change in J-funnel passing time (sec) after kneading | | | | | | Separation resistance evaluation |
| --- | --- | --- | --- | --- | --- | --- | --- | --- |
| | | Immediately | 1 hr | 2 hrs | 3 hrs | 4 hrs | 5 hrs | 6 hrs | |
| Comp. Ex. | 18 | 19.4 | 26.2 | 29.0 | 43.3 | 72.1 | un-measurable | un-measurable | X |

[2] Evaluation of resistance to material separation, ○: maintenance of a J-funnel passing time of 18–30 seconds for four hours or longer after kneading and X: a J-funnel passing time falling out of the ranges

TABLE 16

| Category | Composition No. | Setting time Initial | Setting time Final | Hardening rate evaluation |
| --- | --- | --- | --- | --- |
| Ex. | 17 | 11–40 | 17–20 | ○ |
| | 18 | 10–10 | 16–00 | ○ |
| Comp. Ex. | 18 | 13–50 | 21–10 | X |

3) Evaluation of hardening rate, ○: a setting time of six hours or more (initial) and less than 20 hours (final) and X: a setting time out of the ranges As is clear from Tables 14 to 16, cement self-leveling compositions according to the present invention maintain excellent filling ability for a long period of time and exhibit no material separation and retardation in hardening, as compared with samples employing a conventional powdery dispersant.

Examples 19 to 22

Quick-setting Grout Compositions

The following materials were employed in Examples 19 to 22.

[Materials Employed]

(1) Cement

1. Quick-setting cement, CIMENT FONDU LAFARGE (alumina cement, product of LAFARGE ALUMINATE)

The chemical composition of the quick-setting cement (CIMENT FONDU LAFARGE) is shown in Table 17.

TABLE 17

| Chemical composition of the quick-setting cement (Siman Fondu Raffage) | | | | |
| --- | --- | --- | --- | --- |
| Component | $Al_2O_3$ | CaO | $SiO_2$ | $Fe_2O_3$ |
| (%) | 39.5 | 38.0 | 3.8 | 16.0 |

(2) Gypsum

Type III anhydrous gypsum (Blaine specific surface area 7000 $cm^2/g$)

(3) Fine Aggregate

Limestone crushed sand F. M=2.5

(4) Powdery Cement Dispersant

1. Powdery cement dispersant according to the present invention

Dispersants shown Table 7 were employed.

2. Conventional powdery cement dispersant

Melment F10 (melaminesulfonate salt-formalin condensate, product of SKW Eastasia)

(5) Thickener

Metolose (cellulose thickener, product of Shin-Etsu Chemical Co., Ltd.)

(6) Expansive

1. Calcium oxide expansive (Expan, product of Taiheiyo Cement)

2. Metallic aluminum powder (purity ≧99%, finess of powder ≧180 mesh, JIS K 5906 (Al powder for coating) type II, 88 μm residue ≦2%)

(7) Setting Modifier

1. Setting accelerator: lithium carbonate (commercial product)

2. Setting retarder: tartaric acid (commercial product)

Examples of quick-setting grout compositions according to the present invention will be shown in Table 18.

TABLE 18

| | | Base | | | | Admixtures | | | | | | |
| --- | --- | --- | --- | --- | --- | --- | --- | --- | --- | --- | --- | --- |
| | | Cements | | | | | | | | | Setting modifiers | |
| | | Quick | Ordinary portland | | | Powdery dispersant | | | Expansives | | | |
| Category | Composition No. | cement | cement | Gypsum | Aggregate | Type | Amount | Thickener | Al powder | CaO expansive | Li carbonate | Tartaric acid |
| Ex. | 19 | 25 | 65 | 10 | 120 | Powdery cement dispersant | 0.35 | 0.005 | 0.0015 | 3.5 | 0.2 | 0.20 |

TABLE 18-continued parts by weight

| | | Base | | | | Admixtures | | | | | |
|---|---|---|---|---|---|---|---|---|---|---|---|
| | | Cements | | | | | | | | Setting | |
| | | Quick | Ordinary portland | | | Powdery dispersant | | | Expansives | | modifiers | |
| Category | Composition No. | cement | cement | Gypsum | Aggregate | Type | Amount | Thickener | Al powder | CaO expansive | Li carbonate | Tartaric acid |
| | 20 | 25 | 65 | 10 | 120 | Powdery cement dispersant (1) | 0.30 | 0.005 | 0.0015 | 3.5 | 0.2 | 0.20 |
| | 21 | 16 | 76 | 8 | 120 | Powdery cement dispersant (2) | 0.30 | 0.005 | 0.0015 | 3.5 | 0.2 | 0.25 |
| | 22 | 16 | 76 | 8 | 120 | Powdery cement dispersant (1) | 0.25 | 0.005 | 0.0015 | 3.5 | 0.2 | 0.25 |
| Comp. Ex. | 19 | 25 | 65 | 10 | 120 | Melment F10 | 2.0 | 0.005 | 0.0015 | 3.5 | 0.2 | 0.20 |
| | 20 | 16 | 76 | 8 | 120 | Melment F10 | 1.8 | 0.005 | 0.0015 | 3.5 | 0.2 | 0.25 |

Performance tests of quick-setting grout compositions according to the present invention were carried out as follows.

[Test Example]

Water (19 parts by weight) was added to each material (100 parts by weight) having a composition as shown in Table 18, and the resultant mixture was mixed for three minutes by means of a Hobart mixer, to thereby prepare a slurry. Flow and consistency (J-funnel passing time) of each slurry were measured from immediately after kneading to 40 minutes after kneading with intervals of 10 minutes, so as to evaluate fluidity and viscosity, respectively. Setting time and compressive strength of a hardened sample of a material age of 24 hours were measured so as to evaluate a quick-setting property. The results are shown in Tables 19 to 22.

[Method for Measuring Flow]

Flow was measured on the basis of the "Physical testing method for cement," JIS R 5201.

[Method for Measuring J-funnel Passing Time]

J-funnel passing time was measured on the basis of the PC testing method of grout (JSCE-F531) specified by of Japan Society of Civil Engineers. The employed J-funnel had an outlet having an inner diameter of 14 mm.

[Method for Measuring Setting Time]

Setting time was measured on the basis of the "setting test of concrete by use of a Proctor intrusion needle specified by ASTM-C403T.

[Method for Measuring Compressive Strength]

Compressive strength was measured for a hardened sample of a material age of 24 hours on the basis of the "Physical od for cement," JIS R 5201.

[Method for Measuring Expansion Coefficient]

Expansion coefficient was measured on the basis of the PC testing method of grout (container method) (JSCE-F533) specified by of Japan Society of Civil Engineers to a material of 24 hours.

TABLE 19

| | composition | Time-elapsed change in flow (mm) after kneading | | | | | Fluidity |
|---|---|---|---|---|---|---|---|
| Category | No. | Immediately | 10 min | 20 min | 30 min | 40 min | evaluation[1] |
| Ex. | 19 | 234 | 230 | 224 | 210 | 191 | ○ |
| | 20 | 237 | 235 | 225 | 202 | 183 | ○ |
| | 21 | 244 | 242 | 228 | 203 | 176 | ○ |
| | 22 | 248 | 246 | 230 | 198 | 172 | ○ |
| Comp. Ex. | 19 | 233 | 224 | 210 | 172 | 136 | X |
| | 20 | 237 | 226 | 198 | 136 | 105 | X |

[1]Evaluation of fluidity, ○: maintenance of a flow of 190 mm or more for 30 minutes or longer after kneading and X: a flow lowered to less than 200 mm

TABLE 20

| Category | Composition No. | Time-elapsed change in J-funnel passing time (sec) after kneading | | | | | Viscosity evaluation[2] |
|---|---|---|---|---|---|---|---|
| | | Immediately | 10 min | 20 min | 30 min | 40 min | |
| Ex. | 19 | 7.4 | 8.2 | 8.8 | 12.8 | 18.7 | ○ |
| | 20 | 7.1 | 7.8 | 9.1 | 13.9 | >20 | ○ |
| | 21 | 6.8 | 7.6 | 9.2 | 14.6 | >20 | ○ |
| | 22 | 6.5 | 7.4 | 9.1 | 16.4 | >20 | ○ |
| Comp. Ex. | 19 | 6.8 | 8.8 | 12.4 | >20 | >20 | X |
| | 20 | 6.3 | 8.7 | 17.6 | >20 | >20 | X |

[2]Evaluation of viscosity, ○: a J-funnel passing time of 6–10 seconds immediately after kneading and maintenance of the time of 6–20 seconds for 30 minutes or longer after kneading and X: a J-funnel passing time falling out of the ranges

TABLE 21

| Category | Composition No. | Setting time | | Compressive strength (material age 24 hrs) (N/mm$^2$) | Evaluation[3] |
|---|---|---|---|---|---|
| | | Initial (min) | final (min) | | |
| Ex. | 19 | 75 | 135 | 28 | ○ |
| | 20 | 67 | 124 | 30 | ○ |
| | 21 | 60 | 108 | 26 | ○ |
| | 22 | 54 | 92 | 27 | ○ |
| Comp. Ex. | 19 | 52 | 162 | 22 | X |
| | 20 | 35 | 125 | 19 | X |

[3]Evaluation of hardening rate, ○: a setting time of 40 minutes or more (initial) and 150 minutes or less (final) and a compressive strength of a hardened sample having a material age of 24 hours of 25 N/mm$^2$ or more and X: a setting time and a compressive strength out of the ranges

TABLE 22

| Category | Composition No. | Expansion coefficient (%) | | | | | Expansion coefficient evaluation[4] |
|---|---|---|---|---|---|---|---|
| | | 2 hrs | 4 hrs | 6 hrs | 12 hrs | 24 hrs | |
| Ex. | 19 | +0.33 | +0.45 | +0.57 | +0.68 | +0.72 | ○ |
| | 20 | +0.41 | +0.52 | +0.66 | +0.74 | +0.82 | ○ |
| | 21 | +0.28 | +0.35 | +0.42 | +0.50 | +0.54 | ○ |
| | 22 | +0.30 | +0.37 | +0.43 | +0.48 | +0.52 | ○ |
| Comp. Ex. | 19 | +0.33 | +0.44 | +0.56 | +0.68 | +0.81 | ○ |
| | 20 | +0.44 | +0.53 | +0.66 | +0.78 | +0.83 | ○ |

[4]Evaluation of expansion coefficient, ○: 0–2% and X: out of the range

As is clear from Tables 19 to 22, quick-setting grout compositions according to the present invention maintain excellent filling ability and resistance to material separation for a long period of time and have an excellent quick setting property, as compared with samples employing a conventional powdery dispersant.

Examples 23 to 26

Quick-setting Self-leveling Compositions

The following materials were employed in Examples 23 to 26.

[Materials Employed]

(1) Cement and (2) Gypsum

The same materials as employed in Examples 19 to 22 were employed.

(3) Fine Aggregate

Silica sand (produced in Yamagata area) F. M=2.3

(4) Powdery Cement Dispersant

1. Powdery cement dispersant according to the invention

Dispersants shown Table 7 were employed.

2. Conventional powdery cement dispersant

Melment F10 (melaminesulfonate salt-formalin condensate, product of SKW Eastasia)

(5) Thickener

Metolose (cellulose thickener, product of Shin-Etsu Chemical Co., Ltd.)

(6) Defoaming Agent

SN-defoamer 14HP (product of San Nopco Ltd.)

(7) Setting Modifier

1. Setting accelerator: lithium carbonate (commercial product)

2. Setting retarder: tartaric acid (commercial product)

Examples of quick-setting self-leveling compositions according to the present invention will be shown in Table 23.

TABLE 23 parts by weight

| | | Base | | | | Admixtures | | | | Setting modifiers | |
|---|---|---|---|---|---|---|---|---|---|---|---|
| | | Cements | | | | | | | | | |
| | Composition | Quick | Normal | | | Powdery dispersant | | | Defoaming | Li | Tartaric |
| Category | No. | cement | cement | Gypsum | Aggregate | Type | Amount | Thickener | agent | carbonate | acid |
| Ex. | 23 | 25 | 65 | 10 | 120 | Powdery cement dispersant (1) | 0.35 | 0.2 | 0.2 | 0.2 | 0.2 |
| | 24 | 25 | 65 | 10 | 120 | Powdery cement dispersant (2) | 0.30 | 0.2 | 0.2 | 0.2 | 0.2 |
| | 25 | 16 | 76 | 8 | 120 | Powdery cement dispersant (1) | 0.30 | 0.2 | 0.2 | 0.2 | 0.25 |
| | 26 | 16 | 76 | 8 | 120 | Powdery cement dispersant (2) | 0.25 | 0.2 | 0.2 | 0.2 | 0.25 |
| Comp. Ex. | 21 | 25 | 65 | 10 | 120 | Melment F10 | 2.0 | 0.2 | 0.2 | 0.2 | 0.2 |
| | 22 | 16 | 76 | 8 | 120 | Melment F10 | 1.8 | 0.2 | 0.2 | 0.2 | 0.25 |

Performance tests of quick-setting self-leveling compositions according to the present invention were carried out as follows.

[Test Example]

Water (21 parts by weight) was added to each material (100 parts by weight) having a composition as shown in Table 23, and the resultant mixture was mixed for three minutes by means of a Hobart mixer, to thereby prepare a slurry. Flow of each slurry was measured from immediately after kneading to 60 minutes after kneading with intervals of 10 minutes, so as to evaluate fluidity. Setting time and compressive strength of a hardened sample were measured so as to evaluate a quick setting property. The results are shown in Tables 24 and 25.

[Method for Measuring Flow]

Paste flow was measured on the basis of JASS 15M-103 (quality standard of self-leveling material) specified by Architectural Institute of Japan in the following manner.

A hollow cylindrical pipe piece (inner diameter of 50 mm, height of 51 mm, inner volume of 100 mL) made of vinyl chloride resin was placed upright on a polished glass plate (thickness 5 mm). A prepared quick-setting self-leveling composition was charged into the pipe piece to its top, and the pipe piece was lifted up after charging. After slump of the composition stopped, two arbitrarily selected diameters of the bottom of the slumped paste, which were normal to each other, were measured, to thereby represent the average paste flow the sample. When the time-elapsed flow was measured, the sample slurry was kneaded by means of a Hobart mixer for 20 seconds before measurement.

[Method for Measuring Setting Time]

Setting time was measured on the basis of the "Physical testing method for cement," JIS R 5201.

[Method for Measuring Compressive Strength]

Compressive strength was measured for a hardened sample of a material age of one day on the basis of the "Physical testing method for cement," JIS R 5201.

TABLE 24

| Category | Composition No. | Time-elapsed change in flow (mm) after kneading | | | | | | | Fluidity evaluation[1] |
|---|---|---|---|---|---|---|---|---|---|
| | | Immediately | 10 min | 20 min | 30 min | 40 min | 50 min | 60 min | |
| Ex. | 23 | 222 | 220 | 217 | 214 | 211 | 204 | 196 | ○ |
| | 24 | 226 | 225 | 222 | 217 | 210 | 202 | 189 | ○ |
| | 25 | 241 | 238 | 231 | 220 | 197 | 171 | 125 | ○ |
| | 26 | 246 | 245 | 235 | 221 | 193 | 162 | 96 | ○ |
| Comp. Ex. | 21 | 230 | 226 | 216 | 210 | 198 | 185 | 171 | ○ |
| | 22 | 240 | 221 | 208 | 172 | 136 | 82 | un-measur-able | X |

[1] Evaluation of fluidity, ○: maintenance of a flow of 190 mm or more for 40 minutes or longer after kneading and X: a flow lowered to less than 190 mm

TABLE 25

| Category | Composition No. | Setting time (min.) Initial | Setting time (min.) final | Compressive strength (material age 1 day) (N/mm²) | Hardening rate evaluation[2] |
|---|---|---|---|---|---|
| Ex. | 23 | 92 | 146 | 22.5 | ○ |
|  | 24 | 86 | 138 | 23.4 | ○ |
|  | 25 | 72 | 120 | 21.6 | ○ |
|  | 26 | 68 | 115 | 22.7 | ○ |
| Comp. Ex. | 21 | 78 | 168 | 20.8 | X |
|  | 22 | 54 | 131 | 20.2 | ○ |

[2]Evaluation of hardening rate, ○: a setting time of 40 minutes or more (initial) and 150 minutes or less (final) and a compressive strength of a hardened sample having a material age of one day of 20 N/mm² or more and X: a setting time and a compressive strength out of the ranges As is clear from Tables 24 to 25, quick-setting self-leveling compositions according to the present invention maintain excellent filling ability for a long period of time and have a sufficient quick-setting property, as compared with samples employing a conventional powdery dispersant.

Examples 27 and 28 Quick-setting cement compositions

The following materials were employed in Examples 27 and 28.

[Materials Employed]
(1) Binder (Calcium Aluminate-base Cement Jet Cement, Product of Taiheiyo Cement)
(2) Powdery Cement Dispersant
 1. Powdery cement dispersant according to the present invention
 Dispersants shown Table 7 were employed.
 2. Conventional powdery cement dispersant
 Mighty 100 (naphthalenesulfonate salt-formalin condensate, product of Kao Corporation)
(3) Setting Modifier
 Setting retarder: citric acid (Jet-setter, product of Onoda)

Examples of cement compositions according to the present invention will be shown in Table 26.

TABLE 26

| Category | Composition No. | Binder | Setting Modifier | Powdery dispersant Type | Powdery dispersant Amount |
|---|---|---|---|---|---|
| Example | 27 | 100 | 0.2 | Powdery cement dispersant (1) | 0.20 |
|  | 28 | 100 | 0.2 | Powdery cement dispersant (1) | 0.18 |
| Comp. Ex. | 23 | 100 | 0.3 | Mighty 100 | 1.2 |

Performance tests of cement compositions according to the present invention were carried out as follows.

[Test Example]

Water (40 parts by weight) was added to each material (100 parts by weight) having a composition as shown in Table 26, and the resultant mixture was mixed for three minutes by means of a Hobart mixer, to thereby prepare a slurry. Flow and setting time of each slurry were measured so as to evaluate fluidity and a quick setting property, respectively. The results are shown in Tables 27 and 28.

[Method for Measuring Flow]
Flow was measured on the basis of the "Physical testing method for cement," JIS R 5201.

[Method for Measuring Setting Time]
Setting time was measured on the basis of the "Physical testing method for cement," JIS R 5201.

TABLE 27

| Category | Composition No. | Time-elapsed change in flow (mm) after kneading Immediately | 10 min | 20 min | 30 min | Fluidity evaluation[1] |
|---|---|---|---|---|---|---|
| Ex. | 27 | 219 | 218 | 201 | 190 | ○ |
|  | 28 | 220 | 217 | 202 | 189 | ○ |
| Comp. Ex. | 23 | 213 | 201 | 174 | 152 | X |

[1]Evaluation of fluidity, ○: maintenance of a flow of 180 mm or more for 20 minutes or longer after kneading and X: a flow lowered to less than 180 mm

TABLE 28

| Category | Composition No. | Setting time (min) Initial | Final | Evaluation[2] |
|---|---|---|---|---|
| Example | 27 | 46 | 61 | ○ |
|  | 28 | 40 | 52 | ○ |
| Comp. Ex. | 23 | 72 | 92 | X |

[2]Evaluation of setting time, ○: a setting time of 30 minutes or more (initial) and less than 80 minutes (final) and X: a setting time out of the range As is clear from Tables 27 and 28, cement compositions according to the present invention maintain excellent fluidity for a time required for practical use and have excellent quick-setting properties, as compared with samples employing a conventional powdery cement dispersant.

INDUSTRIAL APPLICABILITY

The powdery dispersant of the present invention exhibits excellent dispersibility which is equivalent to that of a liquid dispersant. For example, even when a cement composition containing the dispersant has low W/C ratio, excellent fluidity of the composition can be secured, and setting of the composition does not retard. The dispersant can be added to cement in advance, and the mixture can be stored or transported in the form of granular mixture, and thus the dispersant is applicable to a so-called premixed product.

The cement grout composition of the present invention can maintain high packing ability and high separation resistance for a prolonged period of time, as compared with a conventional premixed cement grout composition. Therefore, even in the case in which the composition of the present invention is added to a complex structure in large amounts, no problem arises in execution.

The cement self-leveling composition of the present invention can maintain high fluidity for a prolonged period of time, and is rapidly hardened, as compared with a conventional premixed cement self-leveling composition. Therefore, even when the composition of the present invention is installed in large amounts, the composition does not cause deterioration of the precise level, resulting in efficient execution.

The quick-setting grout composition of the present invention can maintain high packing ability and separation resistance for a prolonged period of time, as compared with a conventional premixed quick-setting grout composition. Therefore, the composition of the present invention is applicable to a complex structure, and excellent quick-setting ability of the composition enables reduction in execution period.

The quick-setting self-leveling composition of the present invention can maintain high fluidity for a prolonged period of time, and has sufficient quick-setting ability, as compared with a conventional premixed quick-setting self-leveling composition. Therefore, even when the composition of the present invention is installed in large amounts and the installed surface must be opened within a short time, the composition does not cause deterioration of the precise level, resulting in efficient execution.

The cement composition of the present invention can maintain high fluidity for practically sufficient period of time, and has excellent quick-setting ability, as compared with a conventional premixed cement composition. Therefore, employment of the cement composition of the present invention enables efficient execution and reduction in execution period.

What is claimed is:

1. A process for producing a powdery dispersant for cement-containing compositions, comprising adding 0.01–2.5 wt. % of a reducing agent to a polycarboxylate polymer containing at least two different structural units represented by formulas (1) and (2):

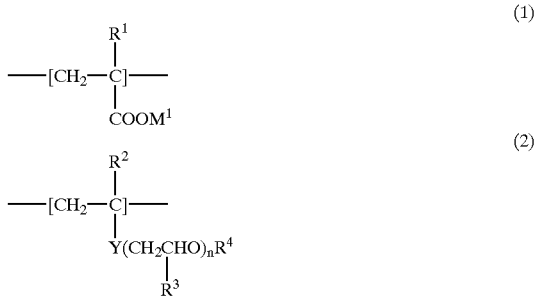

wherein each of $R^1$, $R^2$, and $R^3$, which may be identical or different from one another, represents a hydrogen atom or a methyl group; $R^4$ represents a $C_1$–$C_3$ alkyl group; $M^1$ represents a hydrogen atom, an alkali metal, an alkaline earth metal, ammonium, or an organic amine; Y represents —$CH_2O$— or —COO—; and n is 2–200;

drying, and pulverizing the resultant mixture.

2. The process of claim 1, wherein the reducing agent is an inorganic compound.

3. The process of claim 1, wherein the reducing agent is an organic compound.

4. The process of claim 2, whereon the reducing agent is selected from the group consisting of sulfite salts, nitrite salts and thiosulfate salts.

5. The process of claim 3, wherein the reducing agent is an amine selected from the group consisting of triethanolamine, diethanolamine, mono-ethanolamine, isopropanolamine, sec-butylamine and ethylenediamine.

6. The process of claim 1, wherein the reducing agent is added to a liquid of pH 7–9 predominantly containing said polycarboxylate polymer, said liquid having a pH of 7–9.

7. The process of claim 1, wherein the drying and pulverizing are performed while kneading and mixing.

8. The process of claim 1, wherein the reducing agent is selected from the group consisting of triethanolamine and sodium sulfite.

9. The process of claim 1, wherein the reducing agent contains triethanolamine and sodium sulfite.

10. A powdery dispersant obtained by the process of claim 1.

11. A powdery composition, comprising the powdery dispersant according to claim 10 and a hydraulic material.

12. The powdery composition according to claim 11, wherein the hydraulic material is cement.

13. A powdery composition, comprising the powdery dispersant according to claim 10, a binder, an aggregate, and an expansion accelerator.

14. The powdery composition according to claim 13, further comprising a thickener.

15. A powdery composition, comprising the powdery dispersant according to claim 10, a binder, a fine aggregate, and a defoaming agent.

16. The powdery composition according claim 15, further comprising a thickener.

17. A powdery composition, comprising the powdery dispersant according to claim 10, a quick-setting cement, and gypsum.

18. The powdery composition according to claim 17, further comprising a thickener, a setting modifier, and an aggregate.

19. The powdery composition according to claim 18, wherein the setting modifier comprises an alkali metal salt and hydroxycarboxylic acid.

20. The powdery composition according to claim 17, further comprising an expansion accelerator.

21. The powdery composition according to claim 17, wherein the quick-setting cement comprises monocalcium aluminate and up to 65 wt. % $Al_2O_3$.

22. A powdery composition, comprising the powdery dispersant according to claim 10, a quick-setting cement, gypsum, and a defoaming agent.

23. The powdery composition according to claim 22, further comprising a thickener, a setting modifier, and an aggregate.

24. The powdery composition according to claim 23, wherein the setting modifier comprises an alkali metal salt and hydroxycarboxylic acid.

25. The powdery composition according to claim 22, further comprising an expansion accelerator.

26. The powdery composition according to claim 22, wherein the quick-setting cement comprises monocalcium aluminate and up to 65 wt. % $Al_2O_3$.

27. A powdery composition, comprising the powdery dispersant according to claim 10 and calcium aluminate-containing cement.

* * * * *

UNITED STATES PATENT AND TRADEMARK OFFICE
CERTIFICATE OF CORRECTION

PATENT NO.   : 6,437,027 B1
DATED        : August 20, 2002
INVENTOR(S)  : Hirotaka Isomura et al.

It is certified that error appears in the above-identified patent and that said Letters Patent is hereby corrected as shown below:

<u>Column 37,</u>
Line 47, "whereon" should read -- wherein --.

Signed and Sealed this

Fourth Day of February, 2003

JAMES E. ROGAN
*Director of the United States Patent and Trademark Office*